US011954231B2

(12) United States Patent
Gordon et al.

(10) Patent No.: US 11,954,231 B2
(45) Date of Patent: Apr. 9, 2024

(54) RECURSIVELY ADAPTING A SENSITIVE CONTENT MASKING TECHNIQUE (71) Applicant: INTERNATIONAL BUSINESS MACHINES CORPORATION, Armonk, NY (US)

(72) Inventors: Itai Gordon, Modiin (IL); Shlomit Avrahami, Jerusalem (IL); Rotem Brosh, Be'er Ya'akov (IL); Shiran Yosef, Petach Tiqwa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 611 days.

(21) Appl. No.: 17/151,770

(22) Filed: Jan. 19, 2021

(65) Prior Publication Data
US 2022/0229934 A1  Jul. 21, 2022

(51) Int. Cl.
G06F 21/62 (2013.01)
G06F 16/22 (2019.01)
G06F 16/245 (2019.01)
G06F 16/93 (2019.01)

(52) U.S. Cl.
CPC .......... *G06F 21/6254* (2013.01); *G06F 16/22* (2019.01); *G06F 16/245* (2019.01); *G06F 16/93* (2019.01)

(58) Field of Classification Search
CPC .... G06F 21/6254; G06F 16/22; G06F 16/245; G06F 16/93
See application file for complete search history.

(56) References Cited

U.S. PATENT DOCUMENTS 8,826,370 B2  9/2014 Boukobza
9,268,947 B1  2/2016 Jarlstrom
(Continued)

FOREIGN PATENT DOCUMENTS

CN   109753811 A   *  5/2019
CN   111190833 A   *  5/2020 ......... G06F 12/0246
WO   2017207998 A1   12/2017

OTHER PUBLICATIONS

Cumby et al., "A Machine Learning Based System for Semi-Automatically Redacting Documents," Proceedings of the Twenty-Third Innovative Applications of Artificial Intelligence Conference, IAAI Jan. 2011, pp. 1629-1635.
(Continued)

Primary Examiner — Trong H Nguyen
(74) Attorney, Agent, or Firm — Robert R. Aragona (57) ABSTRACT An embodiment for recursively adapting a sensitive content masking technique is provided. The embodiment may include receiving a request from a primary user to share an original document. The embodiment may also include receiving an identity of a secondary user who needs access to a masked version of the original document. The embodiment may further include scanning the original document for sensitive information and identifying sensitive information in the original document. The identified sensitive information may be displayed to the primary user. The embodiment may also include generating a masked value for each piece of identified sensitive information. The embodiment may further include suggesting one or more groups of secondary users if there are additional secondary users. The embodiment may also include presenting the masked version of the original document to the secondary user. The embodiment may further include indexing the masked version of the original document.

17 Claims, 5 Drawing Sheets

(56) References Cited

U.S. PATENT DOCUMENTS

| | | | |
|---|---|---|---|
| 2006/0242558 A1* | 10/2006 | Racovolis | G06F 40/169 |
| | | | 715/205 |
| 2007/0027880 A1 | 2/2007 | Dettinger | |
| 2009/0025063 A1* | 1/2009 | Thomas | G06F 21/6218 |
| | | | 726/4 |
| 2010/0011000 A1* | 1/2010 | Chakra | G06F 21/6209 |
| | | | 707/E17.005 |
| 2014/0047234 A1 | 2/2014 | Davis | |
| 2014/0230066 A1 | 8/2014 | Hurwitz | |
| 2015/0324606 A1 | 11/2015 | Grondin | |
| 2017/0091279 A1* | 3/2017 | Shah | G06F 21/6218 |
| 2017/0230352 A1* | 8/2017 | Chen | H04L 63/0807 |
| 2018/0191686 A1* | 7/2018 | Ghafourifar | H04L 9/14 |
| 2019/0018976 A1 | 1/2019 | Ohtake | |
| 2021/0081495 A1* | 3/2021 | Hook | H04N 1/448 |
| 2021/0256154 A1* | 8/2021 | Koduru | G06F 21/6245 |
| 2021/0286885 A1* | 9/2021 | Locher | G06F 21/604 |

OTHER PUBLICATIONS

Mell et al., "The NIST Definition of Cloud Computing", National Institute of Standards and Technology, Special Publication 800-145, Sep. 2011, 7 pages.

Subalakshmi et al., "Detecting Data Leakage using Data Allocation Strategies With Fake objects," International Journal of Advanced Research in Computer Engineering & Technology (IJARCET) vol. 3 Issue 11, Nov. 2014, ISSN: 2278-1323, pp. 3855-3862.

\* cited by examiner

RECURSIVELY ADAPTING A SENSITIVE CONTENT MASKING TECHNIQUE

BACKGROUND

The present invention relates generally to the field of computing, and more particularly to a system for recursively adapting a sensitive content masking technique for different users.

Increasingly, users of information technology (IT) systems are required to handle sensitive information. Sensitive information may include Personally Identifiable Information (PII). Examples of PII may include any information that can identify a specific individual, such as a social security number, street address, and date of birth. Sensitive information may also include other Sensitive Personal Information (SPI), such as email address, telephone number, race, ethnicity, and political affiliation. Furthermore, sensitive information includes any information that an individual, or company, may wish to keep private. When a primary user needs to share an original document containing sensitive information with a secondary user, each secondary user may not have the same permissions as that of the primary user. Thus, each secondary user may receive an alternate version of the original document.

SUMMARY

According to one embodiment, a method, computer system, and computer program product for recursively adapting a sensitive content masking technique is provided. The embodiment may include receiving a request from a primary user to share an original document. The primary user may configure a parameter by which sensitive information is masked. The embodiment may also include receiving an identity of a secondary user who needs access to a masked version of the original document. The identity of the second user may be submitted by the primary user. The secondary user may have different permissions to view sensitive information than that of the primary user. The embodiment may further include scanning the original document for sensitive information and identifying sensitive information in the original document. The identified sensitive information may be displayed to the primary user. The embodiment may also include generating a masked value for each piece of identified sensitive information based on the permissions of the secondary user. The masked value of each piece of identified sensitive information may then be incorporated into the masked version of the original document. The embodiment may further include presenting the masked version of the original document to the secondary user. The embodiment may also include indexing the masked version of the original document. The embodiment may further include receiving a query from the primary user for the masked version of the original document in the index that was presented to the secondary user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for recursively adapting a sensitive content masking technique for different users. The following described exemplary embodiments provide a system, method, and program product to, among other things, broadly mask sensitive information in an original document and, accordingly, deliver a masked version of that document to a user based on the permissions of that user. Therefore, the present embodiment has the capacity to improve the technical field of data masking by easing the sharing of documents within a company, without exposing sensitive information and while preserving readability in the documents.

As previously described, users of information technology (IT) systems are required to handle sensitive information. Sensitive information may include Personally Identifiable Information (PII). Examples of PII may include any information that can identify a specific individual, such as a social security number, street address, and date of birth. Sensitive information may also include other Sensitive Personal Information (SPI), such as email address, telephone number, race, ethnicity, and political affiliation. Furthermore, sensitive information includes any information that an individual, or company, may wish to keep private. When a primary user needs to share an original document containing sensitive information with a secondary user, each secondary user may not have the same permissions as that of the primary user. Thus, each secondary user may receive an alternate version of the original document. This alternate version may be required to comply with government, or company, regulations regarding dissemination of sensitive information. This problem is typically addressed by redacting every piece of sensitive information in the original document. However, removing all sensitive information from the original document may render the redacted version unreadable. In addition, it may be difficult for the primary user to understand a question from the secondary user if each secondary user is given a different redacted version of the original document. It may therefore be imperative to have a system in place to implement a broader masking technique which preserves readability without exposing sensitive information. Thus, embodiments of the present invention may provide advantages including, but not limited to, reducing the number of alternate versions of an original document that are disseminated to each secondary user, increasing worker productivity, and safeguarding sensitive information.

According to at least one embodiment, the system may receive a request from a primary user to share an original document with a secondary user. In submitting the request, the primary user may configure a parameter by which sensitive information is masked. The system may then receive an identity of the second user, from the primary user, who needs access to a masked version of the original document. The secondary user may have different permissions, i.e., fewer permissions, than that of the primary user. The system may scan the original document for sensitive information. Upon scanning the original document, the system may identify sensitive information in the original document. Sensitive information may include Personally Identifiable Information (PII), which includes information that can identify a specific individual, such as a social security number, street address, and date of birth. Sensitive information may also include other Sensitive Personal Information (SPI), such as email address, telephone number, race, ethnicity, political affiliation, and a monetary value. Furthermore, sensitive information may include any information that an individual, or company, may wish to keep private. The system may then display the sensitive information to the primary user. The system may generate a masked value for each piece of identified sensitive information based on the permissions of the secondary user. The masked value of each piece of identified sensitive information may then be incorporated into the masked version of the original document. The system may then present the masked version of the original document to the secondary user. The system may index the masked version of the original document. The system may then receive a query from the primary user for the masked version of the original document in the index that was presented to the secondary user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to broadly mask sensitive information in an original document and, accordingly, deliver a masked version of that document to a user based on the permissions of that user.

Figure 1:
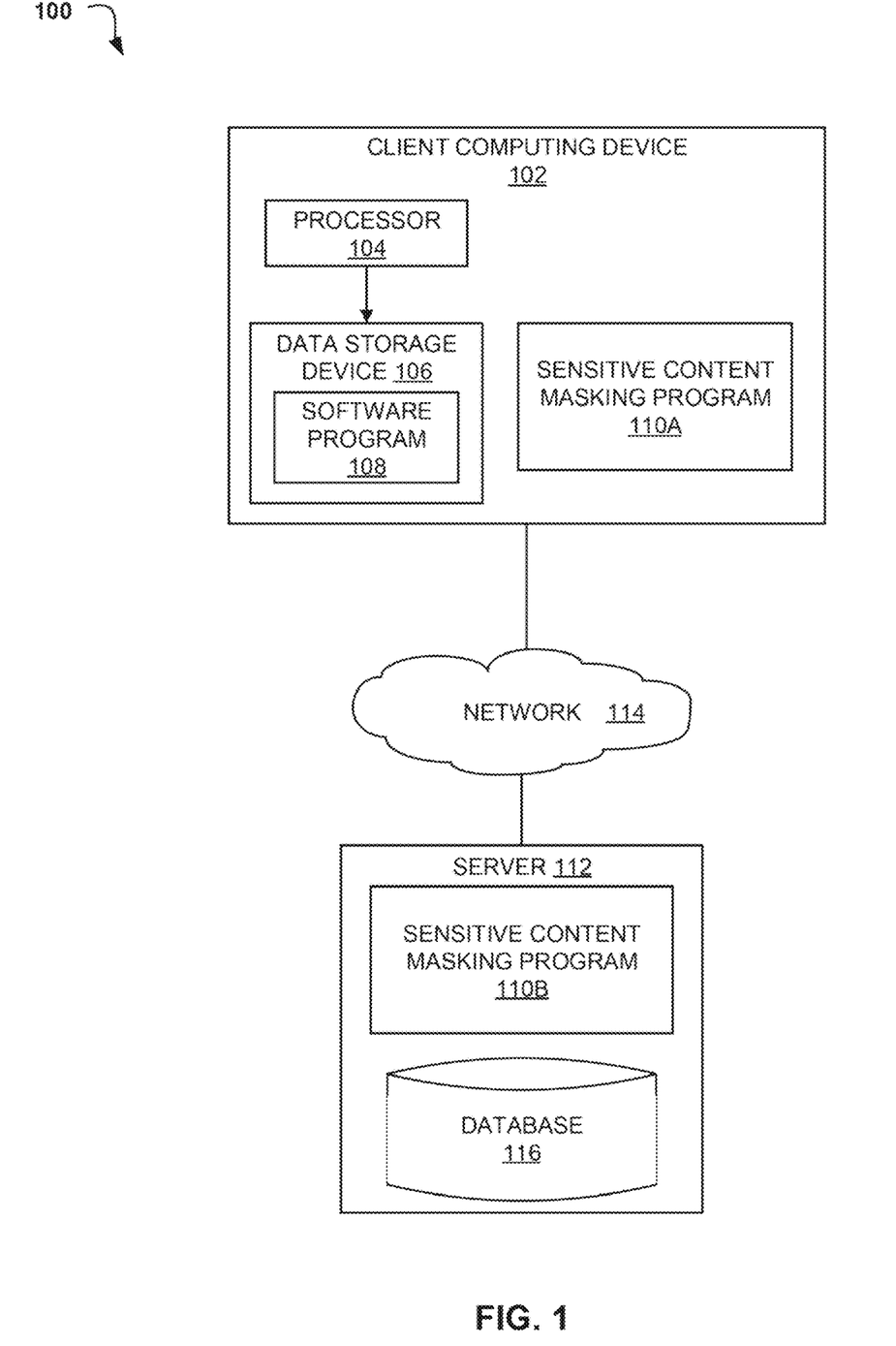
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a sensitive content masking program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a sensitive content masking program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the sensitive content masking program 110A, 110B may be a program capable of scanning an original document for sensitive information, generating a masked value for each piece of identified sensitive information, presenting the appropriate masked version of the original document to each secondary user, reducing the number of alternate versions of an original document that are disseminated to each secondary user, increasing worker productivity, and safeguarding sensitive information. The sensitive content masking method is explained in further detail below with respect to FIG. 2.

Figure 2:
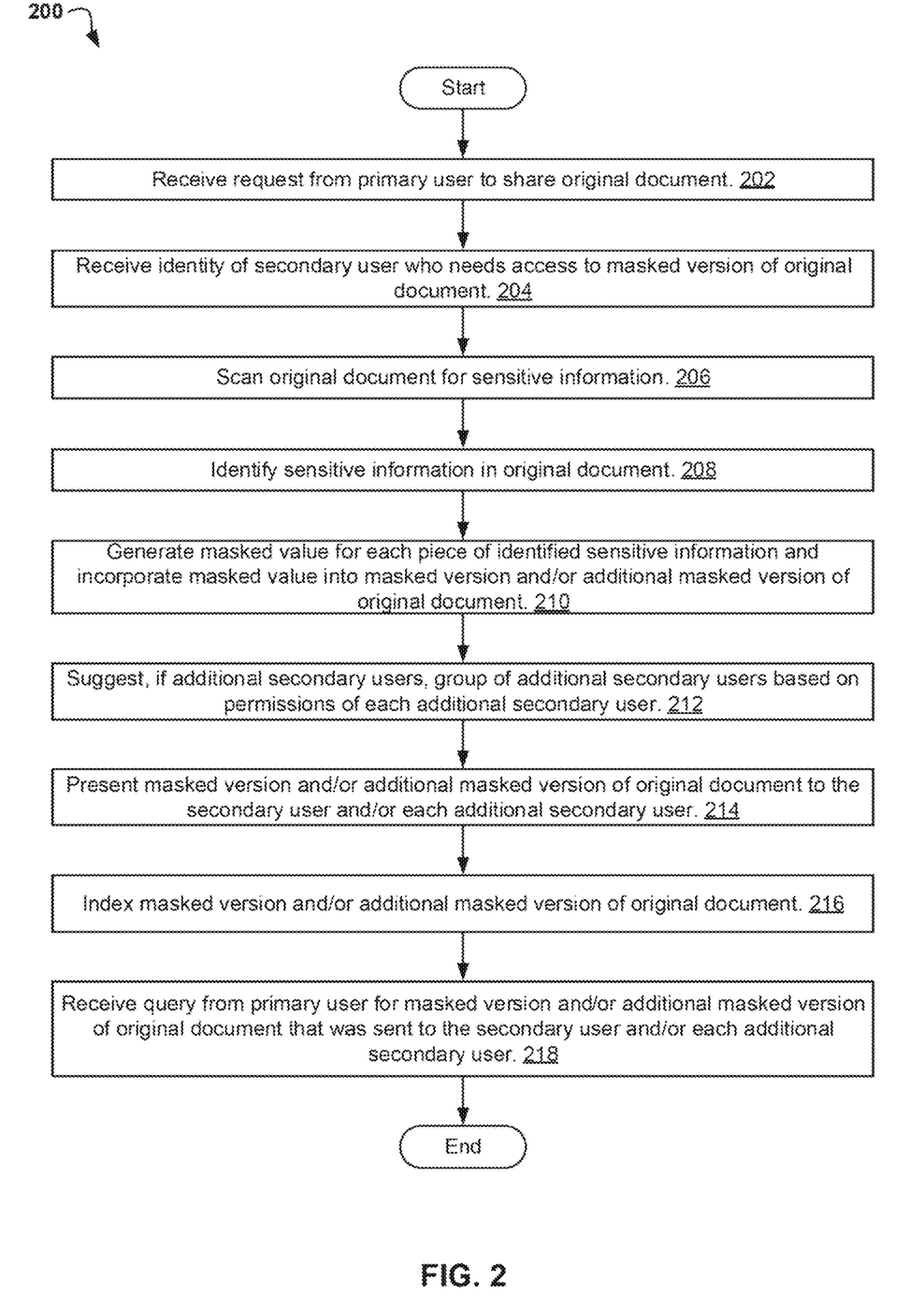
FIG. 2 illustrates an operational flowchart for recursively adapting a sensitive content masking technique in a sensitive content masking process according to at least one embodiment.

Referring now to FIG. 2, an operational flowchart for recursively adapting a sensitive content masking technique in a sensitive content masking process 200 is depicted according to at least one embodiment. At 202, the sensitive content masking program 110A, 110B receives the request from the primary user to share the original document. Using a software program 108 on the primary user's device, the primary user may submit the request to share the original document with the secondary user. In submitting the request, the primary user may configure the parameter by which sensitive information is masked. The parameter may include specifying how to generate the masked value for each piece of identified sensitive information. For example, the primary user may specify a database to be accessed by the sensitive content masking program 110A, 110B, where the database contains possible masked values for each piece of identified sensitive information. In addition, the primary user may configure a range for a numerical value, described in further detail below in step 210. As used herein, "primary user" means a user who has all of the permissions to access sensitive information. In some embodiments, an administrator may configure the parameter by which sensitive information is masked. The administrator may be the primary user, or may be different than the primary user. For purposes of the present embodiment, the administrator is also the primary user. Thus, the primary user may access the original document as written. For example, the primary user may be a partner in a law firm. As used herein, "secondary user" means a user who has different permissions, i.e., fewer permissions, than that of the primary user. Continuing the example above, the secondary user may be an associate in the law firm. Furthermore, if there are a plurality of secondary users, one secondary user may have different permissions than that of another secondary user. Continuing the example above, the associate may have different permissions than a paralegal, the paralegal may have different permissions than a receptionist, and so on. Therefore, embodiments of the present invention provide for a hierarchal structure of viewing sensitive information based on the permissions of the various users.

Then, at 204, the sensitive content masking program 110A, 110B receives the identity of the secondary user who needs access to the masked version of the original document. As described above, the secondary user has different permissions, i.e., fewer permissions, than that of the primary user. The identity of the secondary user may be received from the primary user. For example, when the primary user submits the request to share the original document, the primary user may search for and select the name of the secondary user who will receive the masked version of the original document, explained in further detail below.

Next, at 206, the sensitive content masking program 110A, 110B scans the original document for sensitive information. As described above, sensitive information may include Personally Identifiable Information (PII), which includes information that can identify a specific individual, such as a social security number, street address, and date of birth. Sensitive information may also include other Sensitive Personal Information (SPI), such as email address, telephone number, race, ethnicity, political affiliation, and a monetary value. Furthermore, sensitive information may include any information that an individual, or company, may wish to keep private. The sensitive content masking program 110A, 110B may utilize known machine learning (ML) techniques, such as natural language processing (NLP), to scan the original document for various types of sensitive information.

Then, at 208, the sensitive content masking program 110A, 110B identifies the sensitive information in the original document. The identified sensitive information, along with a classification and sensitivity level of that sensitive information, may be displayed to the primary user, explained in further detail below in this step. As described above, the sensitive content masking program 110A, 110B may utilize ML techniques, such as NLP, to identify sensitive information in the original document. Also, regular expression may be used to identify sensitive information based on patterns in the sensitive information. For example, social security numbers are often written in the form of "XXX-YY-ZZZZ." Regular expression may be used to notice the hyphens in the data and how many characters are separated by the hyphens. Accordingly, if the original document contains data in the form of "XXX-YY-ZZZZ," this data would be identified as sensitive information. Furthermore, the identified sensitive information may be classified, using ML techniques and based on historical data, according to type and level of sensitivity. According to at least one embodiment, the level of sensitivity may be a quantitative scale from "1-3," where "1" indicates the information is highly sensitive, "2" indicates the information is moderately sensitive, and "3" indicates low sensitivity for the information. Continuing the example above, data in the form of "XXX-YY-ZZZZ" may be classified as a social security number. Since a social security number can be a basis for fraud and directly traced back to a specific individual, the social security number may be issued a "1" rating. In another example, data in the form of "@yyymail.com" may be classified as an email address. Since an email address is often known by multiple individuals, the email address may be issued a "3" rating.

Next, at 210, the sensitive content masking program 110A, 110B generates the masked value for each piece of identified sensitive information. The masked value for each piece of identified sensitive information is then incorporated into the masked version of the original document. The sensitive content masking program 110A, 110B may use a masking component, such as IBM's InfoSphere® tools (InfoSphere and all InfoSphere-based trademarks and logos are trademarks or registered trademarks of International Business Machines Corporation and/or its affiliates) to generate the masked value. The masked value generated may be based on the configuration specified by the primary user and the permissions of the secondary user, i.e., what type and level of sensitive information the secondary user is allowed to see. Prior to generating the masked value, the sensitive content masking program 110A, 110B may perform a check when there are one or more additional secondary users. If there are one or more additional secondary users, one or more additional masked versions of the original document may be generated based on the permissions of each additional secondary user. The check may determine the permissions of each additional secondary user, and for two or more additional secondary users with the same permissions, the same masked value may be generated for those additional secondary users. For example, if two additional secondary users are not allowed to see the street of a particular individual, but both are allowed to see the city, the same masked value for the street may be shown to both additional secondary users, along with the original value for just the city. This may ensure the fewest masked versions of the original document as possible.

As described above in step 202, the database specified by the primary user during configuration may contain possible masked values for each piece of identified sensitive information. For example, the database may be a table of values from which to substitute the original value of sensitive information with a broad masked value for that information. The table of values may be obtained from a dictionary of names, a phone book, an address book, a university registry, a medical database, and/or any other database from which substitutes may be obtained. For example, John Doe, Mary Smith, and Bob Johnson may be the names of actual people in the original document. The sensitive content masking program 110A, 110B may substitute the original names with broader masked names in the masked version of the original document based on the permissions of the secondary user. If the secondary user is not allowed to see either the first name or last name, "James" may be substituted for "John Doe," "Becky" may be substituted for "Mary Smith," and "Timothy" may be substituted for "Bob Johnson." Continuing the example, the addresses of John Doe, Mary Smith, and Bob Johnson may be disclosed in the original document. The secondary user may not be allowed to see any part of the address. In this instance, if John Doe lives at 21 Main Street in zip code 10001, "40 Worth Street" may be substituted for "21 Main Street in zip code 10001." In other instances, the secondary user may have permissions to see part of a name and/or part of an address. For example, the secondary user may be allowed to see all parts of a home address except for the street number. In this case, the secondary user may see "country, city, and street" in the masked version of the original document instead of "country, city, street, home number." In yet another instance, again depending on the permissions of the secondary user, a range may be substituted for a numerical value. For example, the secondary user may not be allowed to see a specific monetary amount or date of a transaction. If "$50" is shown in the original document, "$25-$75" may be substituted for "$50" in the masked version of the original document. If the sensitive information is a transaction date, such as "Nov. 11, 2020," the range "Oct. 1, 2020-Dec. 1, 2020" may be substituted for "Nov. 11, 2020" in the masked version of the original document. These broader masked values preserve privacy of the entities being discussed without making the masked version of the original document difficult to read. Additionally, the name mentioned in the original document may be the name of a company. For example, a retail company such as Walmart® (Walmart and all Walmart-based trademarks and logos are trademarks or registered trademarks of Walmart, Inc. and/or its affiliates) may be named in the original document. Depending on the permissions of the secondary user, the broader "retail company" may be substituted for "Walmart®" in the original document. Thus, in generating the masked value, a sensitive word may be mapped to a broader word.

Then, at 212, the sensitive content masking program 110A, 110B, if there are one or more additional secondary users, suggests one or more groups of additional secondary users to the primary user. The suggested one or more groups of additional secondary users may be based on the permissions of each additional secondary user. For example, in a law firm two junior associates may have the same permissions. The sensitive content masking program 110A, 110B may suggest to the primary user that these two junior associates be put into the same group. Thus, members in the same group may have the same permissions.

Next, at 214, the sensitive content masking program 110A, 110B presents the masked version of the original document to the secondary user. When there are one or more additional secondary users, each additional secondary user in the same group may receive the same additional masked version of the original document. Thus, if the primary user wishes to share the original document with only one secondary user, only one masked version of the original document may be generated based on the permissions of that one secondary user. If there are one or more additional secondary users, the one or more additional masked versions of the original document may be presented to each additional secondary user.

Then, at 216, the sensitive content masking program 110A, 110B indexes the masked version of the original document. If generated, the one or more additional masked versions of the original document may also be indexed. The masked version of the original document and any additional masked versions may be indexed using any full text search engine such as Elasticsearch® (Elasticsearch and all Elasticsearch-based trademarks and logos are trademarks or registered trademarks of Elasticsearch BV and/or its affiliates). The masked version of the original document received by the secondary user may be stored in a storage database. If generated, the one or more additional masked versions of the original document that were presented to each additional secondary user may also be stored in the storage database. Furthermore, the sensitivity type and level of a piece of sensitive information may be mapped to the masked value generated for that piece of sensitive information. For example, "John Doe, Sensitivity Type-Name, Sensitivity Level-1" may be mapped to "James," and this information may also be stored in the storage database.

Next, at 218, the sensitive content masking program 110A, 110B receives the query from the primary user for the masked version of the original document in the index that was presented to the secondary user. If generated, the query may also be received for the one or more additional masked versions of the original document in the index that were presented to each additional secondary user. The primary user may utilize the search engine described above to query both the original document and the masked version of the original document that was presented to the secondary user and, if generated, the one or more additional masked versions of the original document that were presented to each additional secondary user. In response to the query, the masked version of the original document that was presented to the secondary user may be returned to the primary user, along with the identity of the secondary user who received the masked version of the original document. If generated, the one or more additional masked versions of the original document that were presented to each additional secondary user may also be returned to the primary user, along with the identities of each additional secondary user and which additional secondary user received which additional masked version of the original document. In this manner, if the secondary user and/or one or more additional secondary users has a question for the primary user about an element in the masked version of the original document and/or the one or more additional masked versions of the original document, the primary user may see the masked value of sensitive information that was presented to the secondary user and/or the one or more additional secondary users. Thus, the primary user would be able to understand the topic with which the secondary user and/or the one or the one or more additional secondary users is discussing.

It may be appreciated that FIG. 2 provides only an illustration of one implementation and does not imply any limitations with regard to how different embodiments may be implemented. Many modifications to the depicted environments may be made based on design and implementation requirements.

Figure 3:
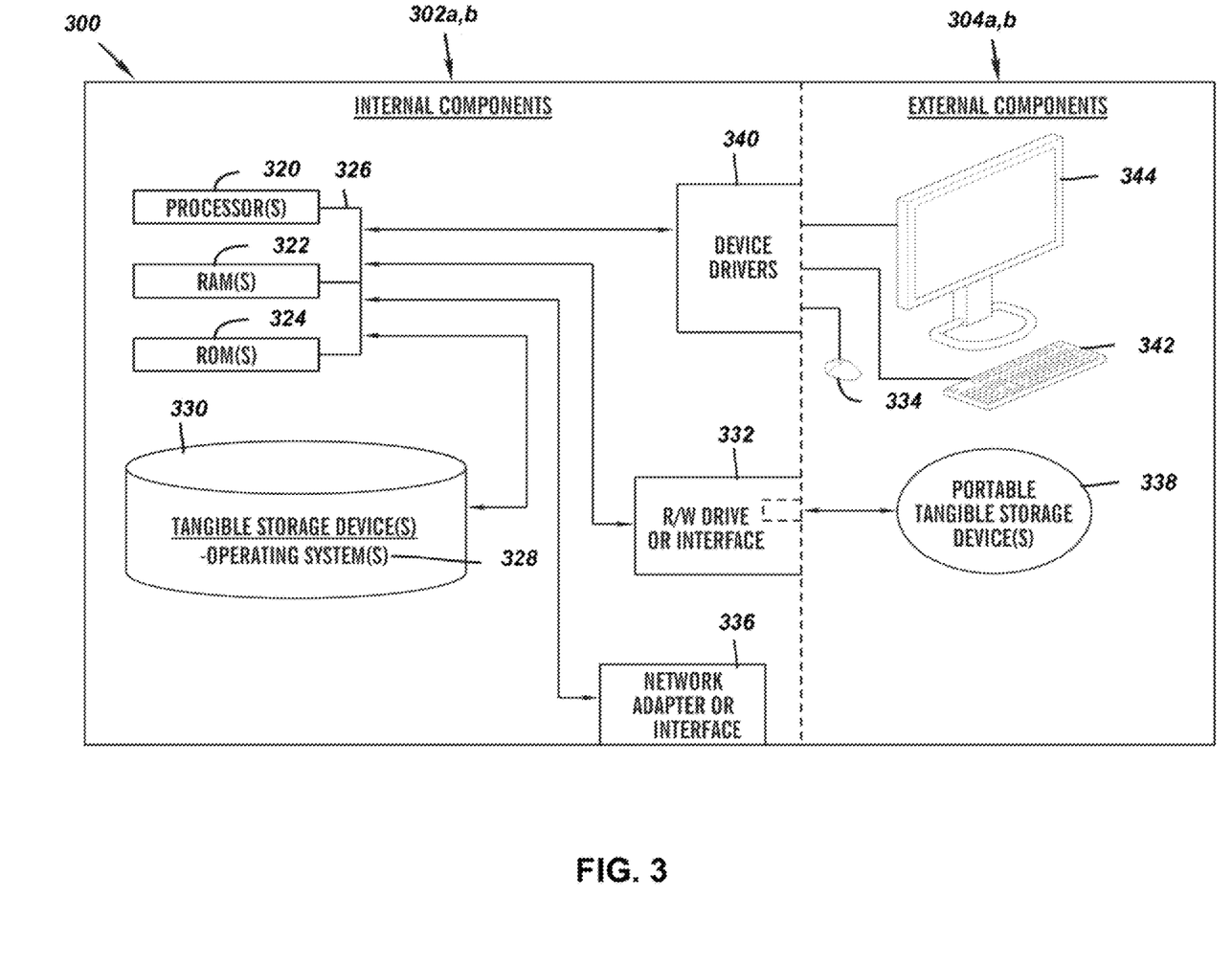
FIG. 3 is a functional block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302a,b and external components 304a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the sensitive content masking program 110A in the client computing device 102 and the sensitive content masking program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the sensitive content masking program 110A, 110B, can be stored on one or more of the respective portable computer-readable tangible storage devices 338, read via the respective R/W drive or interface 332, and loaded into the respective hard drive 330.

Each set of internal components 302a,b also includes network adapters or interfaces 336 such as a TCP/IP adapter cards, wireless Wi-Fi interface cards, or 3G or 4G wireless interface cards or other wired or wireless communication links. The software program 108 and the sensitive content masking program 110A in the client computing device 102 and the sensitive content masking program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the sensitive content masking program 110A in the client computing device 102 and the sensitive content masking program 110B in the server 112 are loaded into the respective hard drive 330. The network may comprise copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
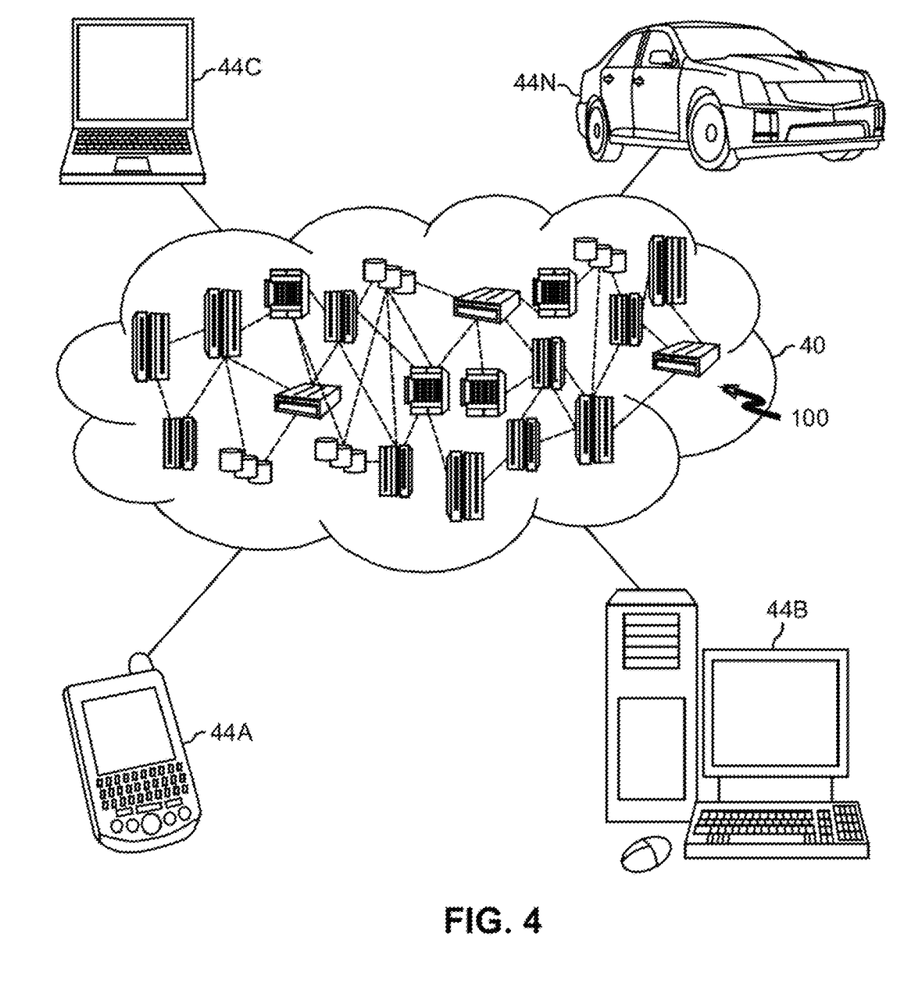
FIG. 4 depicts a cloud computing environment according to an embodiment of the present invention.

Referring now to FIG. 4, illustrative cloud computing environment 40 is depicted. As shown, cloud computing environment 40 comprises one or more cloud computing nodes 100 with which local computing devices used by cloud consumers, such as, for example, personal digital assistant (PDA) or cellular telephone 44A, desktop computer 44B, laptop computer 44C, and/or automobile computer system 44N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 40 to offer infrastructure, platforms and/or software as services for which a cloud consumer does not need to maintain resources on a local computing device. It is understood that the types of computing devices 44A-N shown in FIG. 4 are intended to be illustrative only and that computing nodes 100 and cloud computing environment 40 can communicate with any type of computerized device over any type of network and/or network addressable connection (e.g., using a web browser).

Figure 5:
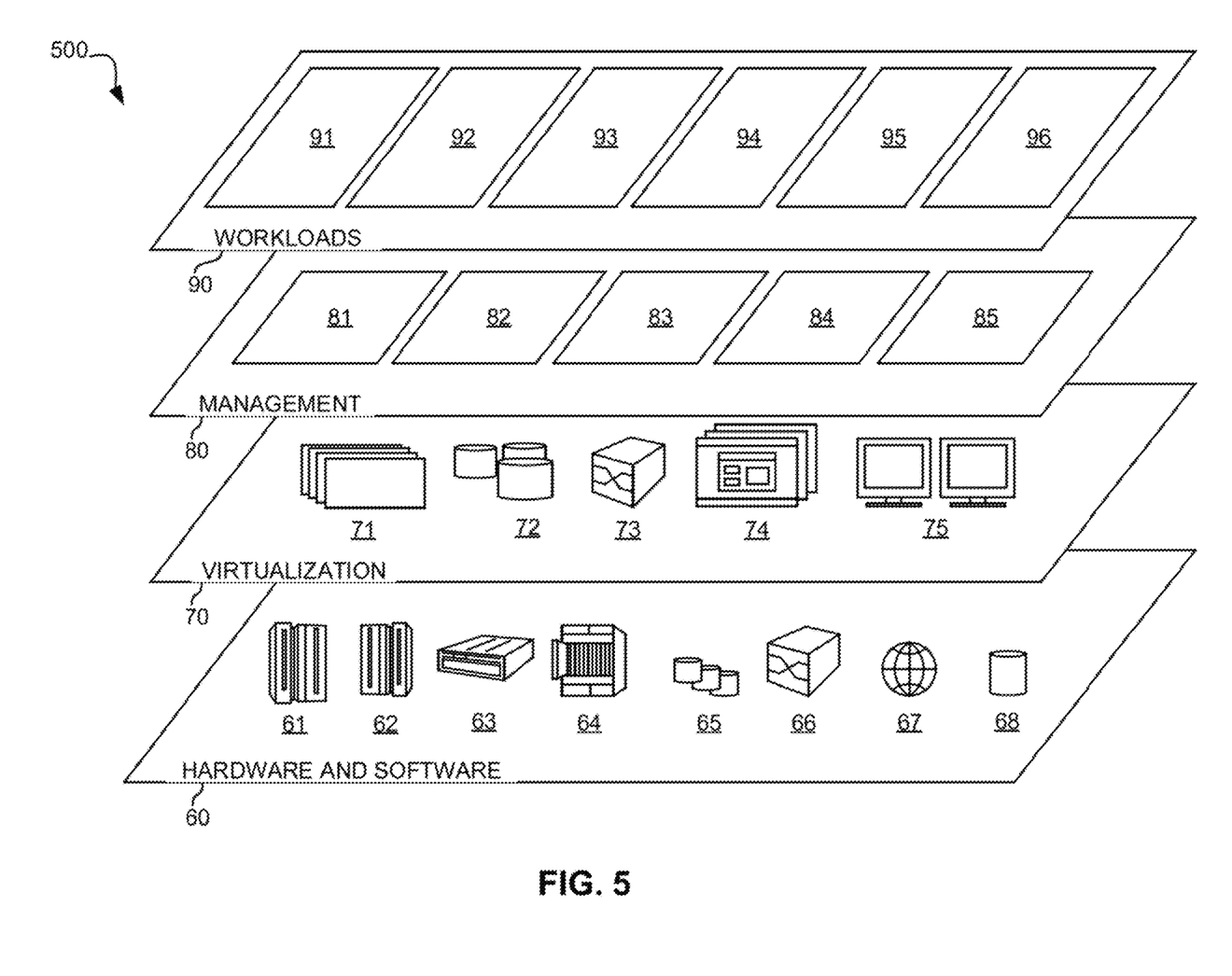
FIG. 5 depicts abstraction model layers according to an embodiment of the present invention.

Referring now to FIG. 5, a set of functional abstraction layers 500 provided by cloud computing environment 40 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recursively adapting a sensitive content masking technique for different users 96. Recursively adapting a sensitive content masking technique for different users 96 may relate to broadly masking sensitive information in an original document in order to deliver a masked version of that document to a user based on the permissions of that user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of recursively adapting a sensitive content masking technique, the method comprising:

receiving a request from a primary user to share an original document, wherein the primary user configures a parameter for masking of sensitive information;

receiving an identity, from the primary user, of a secondary user who needs access to a masked version of the original document, wherein the secondary user has different permissions than that of the primary user;

identifying the sensitive information in the original document, wherein the identified sensitive information is displayed to the primary user;

classifying, by a machine learning (ML) model, each piece of the identified sensitive information according to a sensitivity type and a level of sensitivity, and wherein the level of sensitivity is a quantitative scale configured by the primary user;

generating a masked value for each piece of the identified sensitive information based on the permissions of the secondary user including the sensitivity type and the level of sensitivity the secondary user is authorized to access, wherein the masked value of each piece of the identified sensitive information is incorporated into the masked version of the original document, and wherein generating the masked value further comprises substituting, for each piece of the identified sensitive information, an original value of the piece of the identified sensitive information with a generic value; and presenting the masked version of the original document to the secondary user.

2. The method of claim 1, wherein generating the masked value for each piece of the identified sensitive information further comprises:

suggesting, to the primary user, responsive to determining that there are one or more additional secondary users, one or more groups of additional secondary users based on permissions of each additional secondary user;

generating one or more additional masked versions of the original document based on the permissions of each additional secondary user; and presenting the one or more additional masked versions of the original document to each additional secondary user, wherein each additional secondary user in a same group receives a same additional masked version of the original document.

3. The method of claim 2, further comprising:

indexing the masked version of the original document and the one or more additional masked versions of the original document; and receiving a query from the primary user for the masked version of the original document in the index that was presented to the secondary user and the one or more additional masked versions of the original document in the index that were presented to each additional secondary user.

4. The method of claim 3, wherein receiving the query from the primary user further comprises:

returning, to the primary user, the masked version of the original document that was presented to the secondary user and the one or more additional masked versions of the original document that were presented to each additional secondary user; and identifying the secondary user who received the masked version of the original document and which additional secondary user received which additional masked version of the original document.

5. The method of claim 4, wherein the masked version of the original document received by the secondary user and the one or more additional masked versions of the original document that were presented to each additional secondary user is stored in a storage database.

6. The method of claim 1, wherein the identified sensitive information is selected from a group consisting of a social security number, street address, date of birth, email address, telephone number, race, ethnicity, and a monetary value.

7. A computer system, the computer system comprising:

one or more processors, one or more computer-readable memories, one or more computer-readable tangible storage medium, and program instructions stored on at least one of the one or more tangible storage medium for execution by at least one of the one or more processors via at least one of the one or more computer-readable memories, wherein the computer system is configured to perform operations comprising:

receiving a request from a primary user to share an original document, wherein the primary user configures a parameter for masking of sensitive information;

receiving an identity, from the primary user, of a secondary user who needs access to a masked version of the original document, wherein the secondary user has different permissions than that of the primary user;

identifying the sensitive information in the original document, wherein the identified sensitive information is displayed to the primary user;

classifying, by a machine learning (ML) model, each piece of the identified sensitive information according to a sensitivity type and a level of sensitivity, and wherein the level of sensitivity is a quantitative scale configured by the primary user;

generating a masked value for each piece of the identified sensitive information based on the permissions of the secondary user including the sensitivity type and the level of sensitivity the secondary user is authorized to access, wherein the masked value of each piece of the identified sensitive information is incorporated into the masked version of the original document, and wherein generating the masked value further comprises substituting, for each piece of the identified sensitive information, an original value of the piece of the identified sensitive information with a generic value; and presenting the masked version of the original document to the secondary user.

8. The computer system of claim 7, wherein generating the masked value for each piece of the identified sensitive information further comprises:

suggesting, to the primary user, responsive to determining that there are one or more additional secondary users, one or more groups of additional secondary users based on permissions of each additional secondary user;

generating one or more additional masked versions of the original document based on the permissions of each additional secondary user; and presenting the one or more additional masked versions of the original document to each additional secondary user, wherein each additional secondary user in a same group receives a same additional masked version of the original document.

9. The computer system of claim 8, further comprising:

indexing the masked version of the original document and the one or more additional masked versions of the original document; and receiving a query from the primary user for the masked version of the original document in the index that was presented to the secondary user and the one or more additional masked versions of the original document in the index that were presented to each additional secondary user.

10. The computer system of claim 9, wherein receiving the query from the primary user further comprises:

returning, to the primary user, the masked version of the original document that was presented to the secondary user and the one or more additional masked versions of the original document that were presented to each additional secondary user; and identifying the secondary user who received the masked version of the original document and which additional secondary user received which additional masked version of the original document.

11. The computer system of claim 10, wherein the masked version of the original document received by the secondary user and the one or more additional masked versions of the original document that were presented to each additional secondary user is stored in a storage database.

12. The computer system of claim 7, wherein the identified sensitive information is selected from a group consisting of a social security number, street address, date of birth, email address, telephone number, race, ethnicity, and a monetary value.

13. A computer program product, the computer program product comprising:
  one or more computer-readable storage medium and program instructions stored on at least one of the one or more computer-readable storage medium, the program instructions, upon execution by a processor, cause the processor to perform operations comprising:
    receiving a request from a primary user to share an original document, wherein the primary user configures a parameter for masking of sensitive information;
    receiving an identity, from the primary user, of a secondary user who needs access to a masked version of the original document, wherein the secondary user has different permissions than that of the primary user;
    identifying the sensitive information in the original document, wherein the identified sensitive information is displayed to the primary user;
    classifying, by a machine learning (ML) model, each piece of the identified sensitive information according to a sensitivity type and a level of sensitivity, and wherein the level of sensitivity is a quantitative scale configured by the primary user;
    generating a masked value for each piece of the identified sensitive information based on the permissions of the secondary user including the sensitivity type and the level of sensitivity the secondary user is authorized to access, wherein the masked value of each piece of the identified sensitive information is incorporated into the masked version of the original document, and wherein generating the masked value further comprises substituting, for each piece of the identified sensitive information, an original value of the piece of the identified sensitive information with a generic value; and
    presenting the masked version of the original document to the secondary user.

14. The computer program product of claim 13, wherein generating the masked value for each piece of the identified sensitive information further comprises:
  suggesting, to the primary user, responsive to determining that there are one or more additional secondary users, one or more groups of additional secondary users based on permissions of each additional secondary user;
  generating one or more additional masked versions of the original document based on the permissions of each additional secondary user; and
  presenting the one or more additional masked versions of the original document to each additional secondary user, wherein each additional secondary user in a same group receives a same additional masked version of the original document.

15. The computer program product of claim 14, further comprising:
  indexing the masked version of the original document and the one or more additional masked versions of the original document; and
  receiving a query from the primary user for the masked version of the original document in the index that was presented to the secondary user and the one or more additional masked versions of the original document in the index that were presented to each additional secondary user.

16. The computer program product of claim 15, wherein receiving the query from the primary user further comprises:
  returning, to the primary user, the masked version of the original document that was presented to the secondary user and the one or more additional masked versions of the original document that were presented to each additional secondary user; and
  identifying the secondary user who received the masked version of the original document and which additional secondary user received which additional masked version of the original document.

17. The computer program product of claim 16, wherein the masked version of the original document received by the secondary user and the one or more additional masked versions of the original document that were presented to each additional secondary user is stored in a storage database.

* * * * *